United States Patent
Chen

(10) Patent No.: US 10,377,531 B2
(45) Date of Patent: Aug. 13, 2019

(54) SAW MACHINE PLACEMENT BASE

(71) Applicant: Rexon Industrial Corp., Ltd., Taichung (TW)

(72) Inventor: An-Ni Chen, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 163 days.

(21) Appl. No.: 15/584,065

(22) Filed: May 2, 2017

(65) Prior Publication Data

US 2018/0264564 A1 Sep. 20, 2018

(30) Foreign Application Priority Data

Mar. 16, 2017 (TW) .............................. 106108684 A

(51) Int. Cl.
  *B65D 25/10* (2006.01)
  *B23D 59/00* (2006.01)

(52) U.S. Cl.
  CPC ............. *B65D 25/10* (2013.01); *B23D 59/00* (2013.01)

(58) Field of Classification Search
  CPC .............................. B23D 47/025; B65D 25/10
  USPC ....... 206/349, 565, 560, 378, 477, 478, 492, 206/561
  See application file for complete search history.

(56) References Cited

U.S. PATENT DOCUMENTS

| | | | | |
|---|---|---|---|---|
| 2,287,005 A * | 6/1942 | Greaves | ................. | G03B 21/54 206/561 |
| 3,437,423 A * | 4/1969 | Mondiadis | ................ | A61L 2/26 206/511 |
| 5,050,734 A * | 9/1991 | Chen | ................... | G11B 33/0455 206/308.1 |
| 5,203,454 A * | 4/1993 | Strong | ................... | B65D 25/10 206/560 |
| 5,284,245 A * | 2/1994 | Slivon | .................... | B25H 3/003 206/378 |
| 5,573,116 A * | 11/1996 | Zink | ........................ | B25H 3/06 206/377 |
| 5,848,694 A * | 12/1998 | Newton | ................. | B25H 3/003 206/373 |
| 6,315,121 B1 * | 11/2001 | Hansen | .................... | B25H 3/04 206/376 |
| 6,976,582 B2 * | 12/2005 | Chen | ........................ | B25H 3/04 206/376 |

(Continued)

FOREIGN PATENT DOCUMENTS

TW I535512 B 6/2016

*Primary Examiner* — Chun Hoi Cheung

(74) *Attorney, Agent, or Firm* — Bacon & Thomas, PLLC

(57) ABSTRACT

A saw machine placement base for holding a saw machine including a saw machine base, a saw table mounted at the saw machine base and a cutting unit pivotally connected to the saw table. The saw machine placement base includes a bottom wall, a peripheral wall intersected with the bottom wall and defining with the bottom wall an accommodation chamber, and one or multiple position clamps connected to one of the bottom wall and the peripheral wall within the accommodation chamber and adapted for clamping on the machine base of the saw machine against the peripheral wall to hold down the saw machine in the accommodation chamber. The saw machine placement base is also usable in conjunction with the saw machine as a support to extend the length of the machine base.

10 Claims, 9 Drawing Sheets

(56) References Cited

U.S. PATENT DOCUMENTS

2002/0121491 A1\* 9/2002 Ernst ..................... A47F 7/0035
                                                    211/70.6
2012/0228187 A1\* 9/2012 Pharr ................. A47G 23/0303
                                                    206/557

\* cited by examiner

SAW MACHINE PLACEMENT BASE

BACKGROUND OF THE INVENTION

1. Field of the Invention

The present invention relates to saw machine technology and more particularly, to a saw machine placement base for holding a saw machine for storage.

2. Description of the Related Art

A folding saw machine (TW Patent 1535512) consisting of a saw machine base, a saw table and a cutting unit is known. The cutting unit can be moved from an operating position to a collapsed position. When the cutting unit is set in the operating position, the saw blade and the saw table defines therebetween a contained angle within 90-45 degree. When the cutting unit is set in the collapsed position, the end edge of the saw blade is disposed in proximity to the saw table, and thus, the dimension of the saw machine is minimized, reducing space occupation and saving packing materials.

The aforesaid prior art saw machine design can be extended to the operating position or received in the collapsed position. When the saw machine is not used and to be temporarily received, the overall volume of the collapsed saw machine is minimized to reduce space occupation and saving packing and delivery costs.

When the aforesaid saw machine is collapsed and held in an upright standing position, it can be received in a narrow storage space, facilitating optimal space utilization. Therefore, it is important to achieve positive positioning of the collapsed saw machine.

SUMMARY OF THE INVENTION

The present invention has been developed in view of the above identified circumstances. It is one of the main objects of the present invention to provide a saw machine placement base, which can hold the saw machine positively in position for storage.

To achieve this and other objects of the present invention, a saw machine placement base is adapted for holding a saw machine comprising a saw machine base, a saw table mounted at the saw machine base and a cutting unit pivotally connected to the saw table. The saw machine placement base comprises a bottom wall, a peripheral wall interconnected with the bottom wall, an accommodation chamber surrounded by the bottom wall and the peripheral wall, and at least one position clamp connected to one of the bottom wall and the peripheral wall within the accommodation chamber for securing the saw machine base in the accommodation chamber between the at least one position clamp and the peripheral wall.

One of the effects of the present invention is that: the saw machine base of the saw machine can be inserted into the accommodation chamber and secured in between the position clamp and the peripheral wall. Since the saw machine placement base can be used to hold the collapsed saw machine positively in an upright standing position, the saw machine placement base with the received saw machine can be received in a narrow storage space, facilitating optimum space utilization.

Other and further advantages and features of the present invention will be understood by reference to the following specification in conjunction with the accompanying drawings.

DETAILED DESCRIPTION OF THE INVENTION

Figure 1:
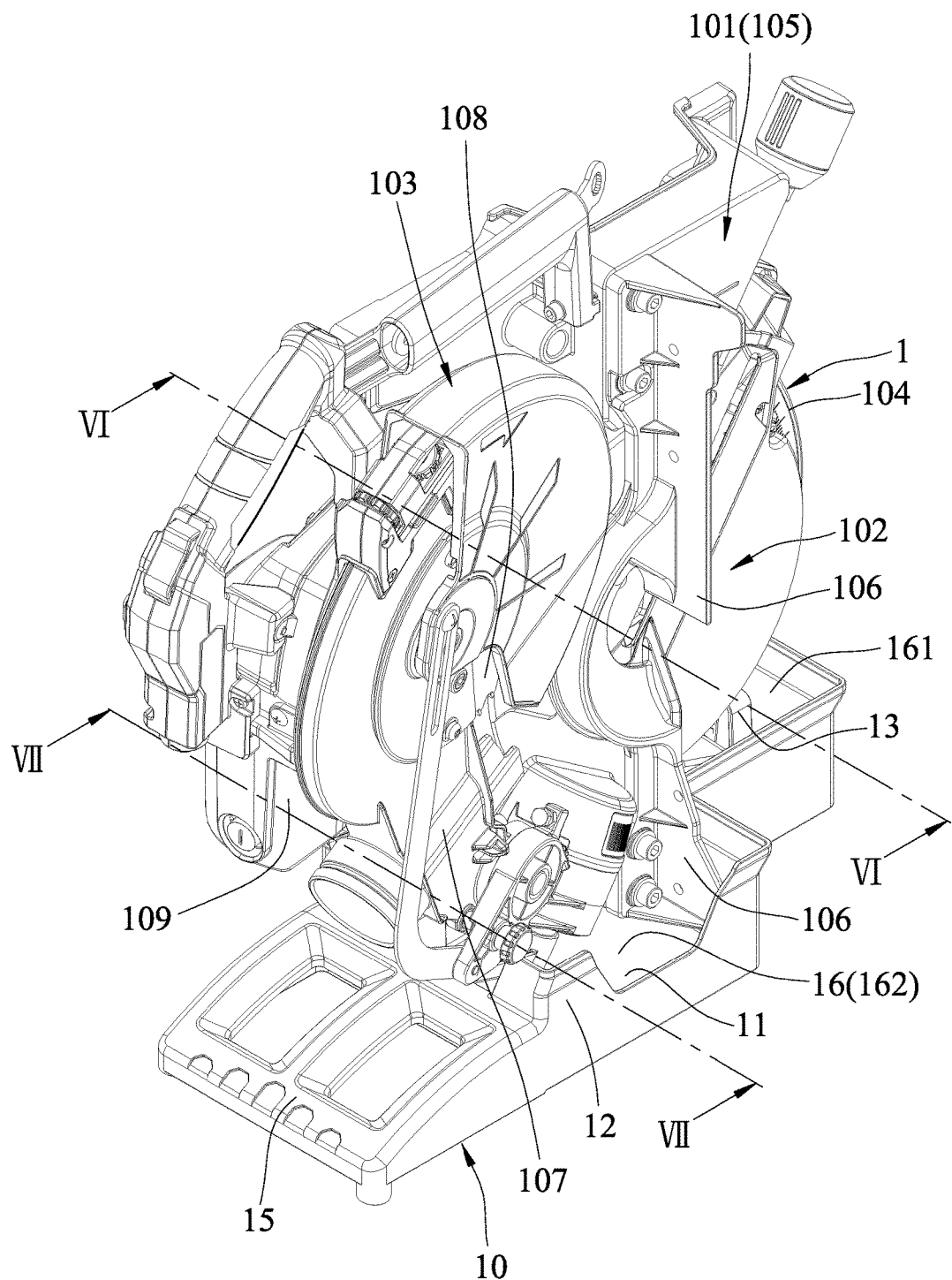
FIG. 1 is an oblique top elevational view, illustrating a saw machine received in a saw machine placement base in accordance with the present invention.
Figure 2:
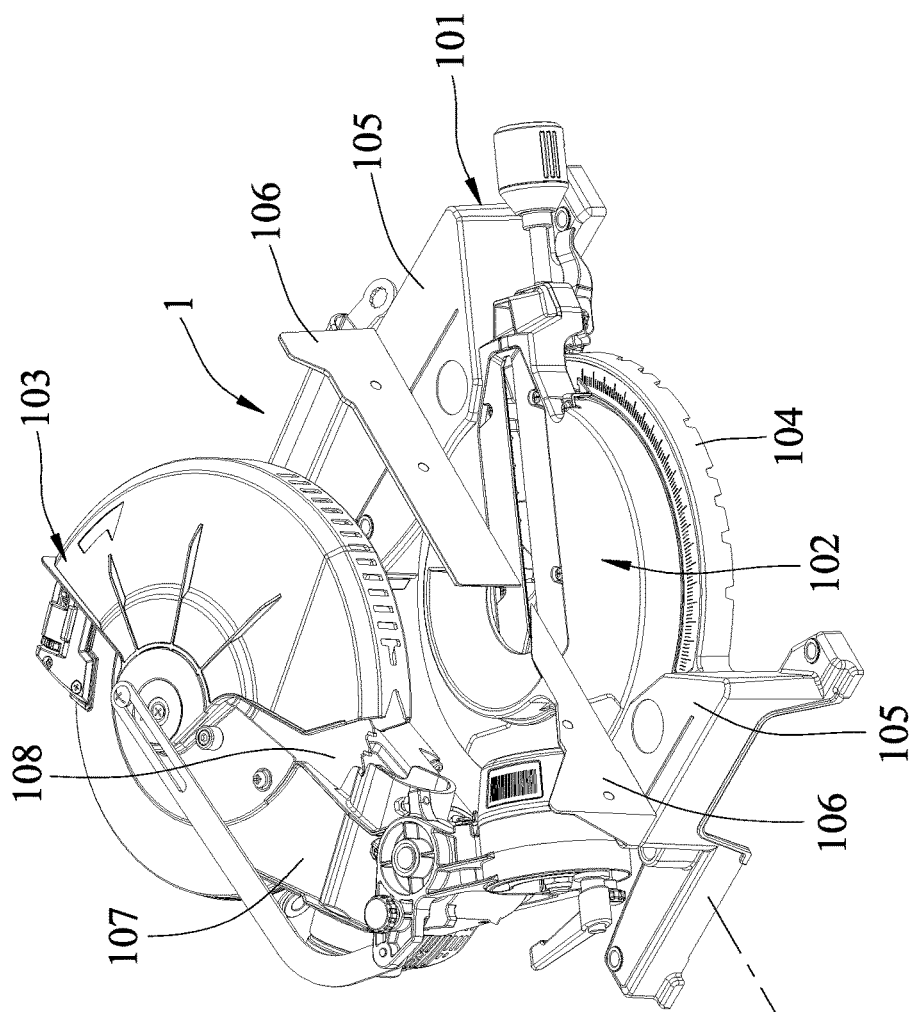
FIG. 2 is an exploded view of the saw machine and the saw machine placement base shown in FIG. 1.
Figure 2:
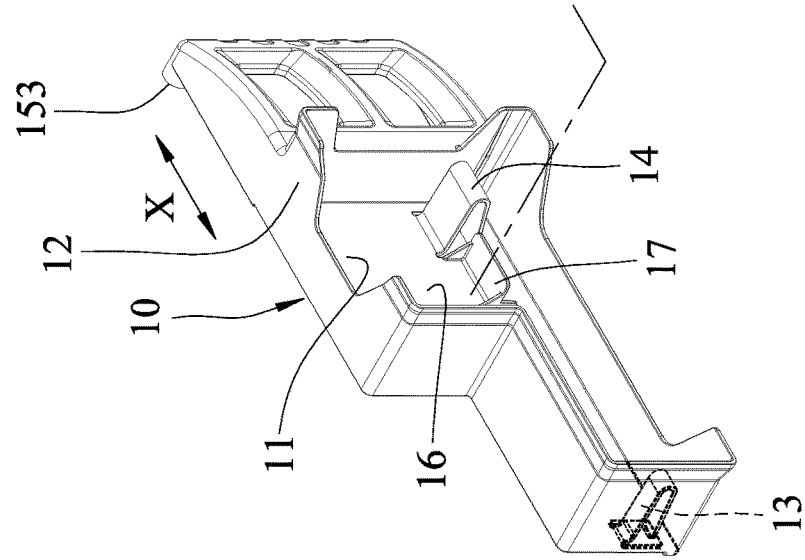

Referring to FIGS. 1 and 2, a saw machine placement base 10 in accordance with the present invention is adapted for holding a saw machine 1. The saw machine 1 comprises a saw machine base 101, a saw table 102 mounted at the saw machine base 101, and a cutting unit 103 pivotally connected to the saw table 102. The saw machine base 101 comprises a disk-like base 104, and two foot members 105 respectively radially connected to two opposite lateral sides of the disk-like base 104. The saw table 102 is rotatably supported on the disk-like base 104 between the two foot members 105, having two rip fences 106 arranged on a top surface thereof and respectively extended to the foot members 105. The cutting unit 103 comprises a saw arm 107 pivotally connected to the saw table 102, a saw blade 108 rotatably mounted at the saw arm 107, and a power drive 109 mounted at the saw arm 107 and operable to rotate the saw blade 108, e.g., a motor and drive assembly.

Figure 3:
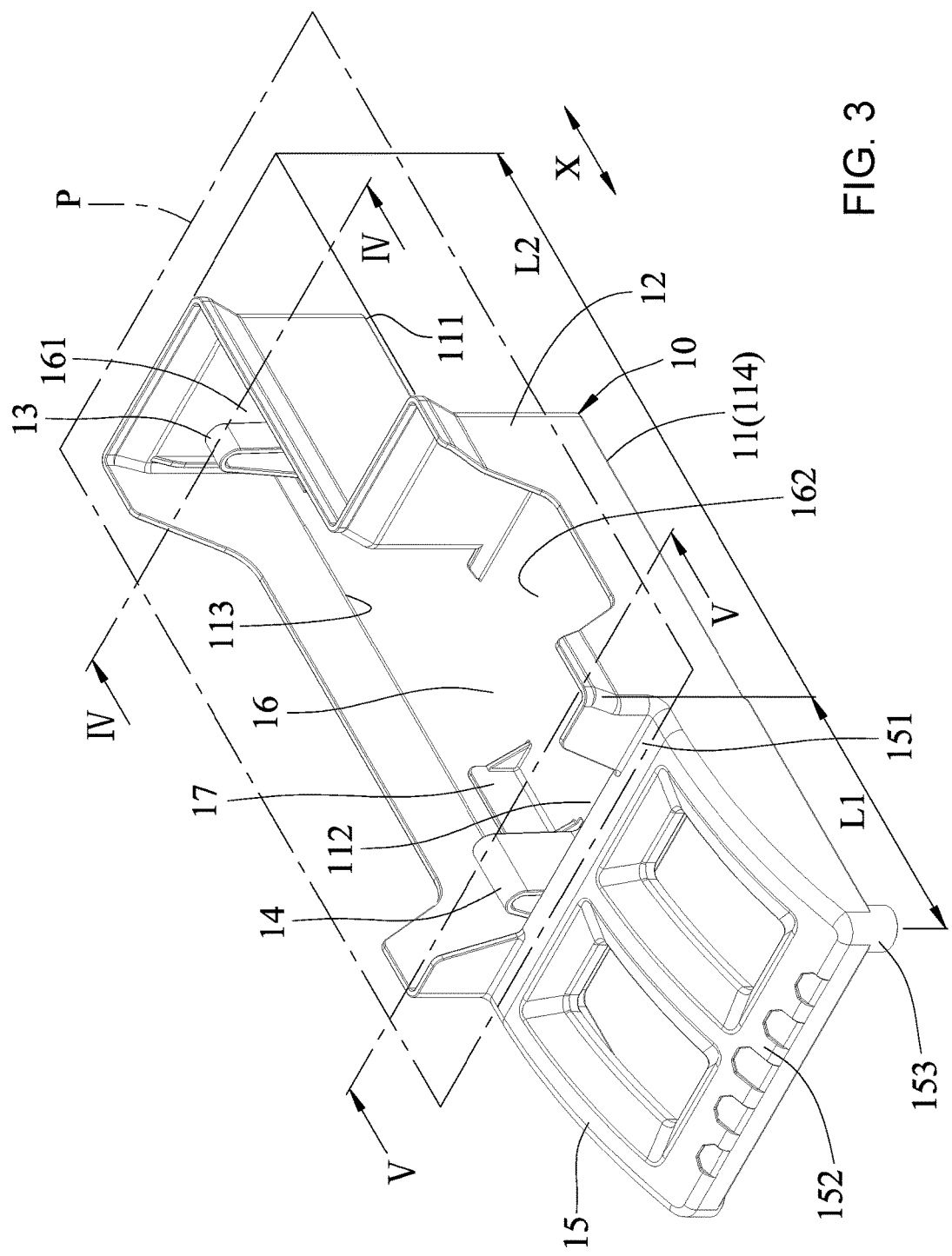
FIG. 3 is an oblique top elevational view of the saw machine placement base in accordance with the present invention.
Figure 4:
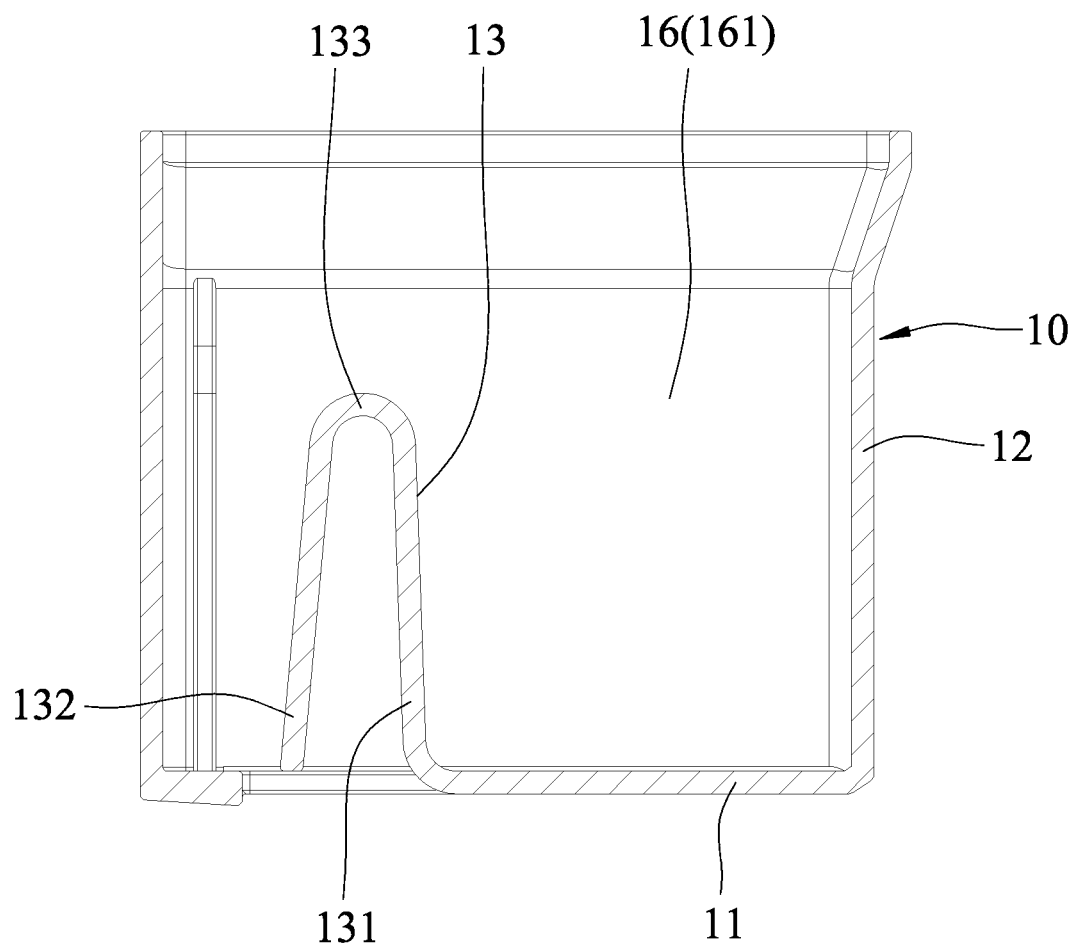
FIG. 4 is a sectional view taken along line IV-IV of FIG. 3.
Figure 5:
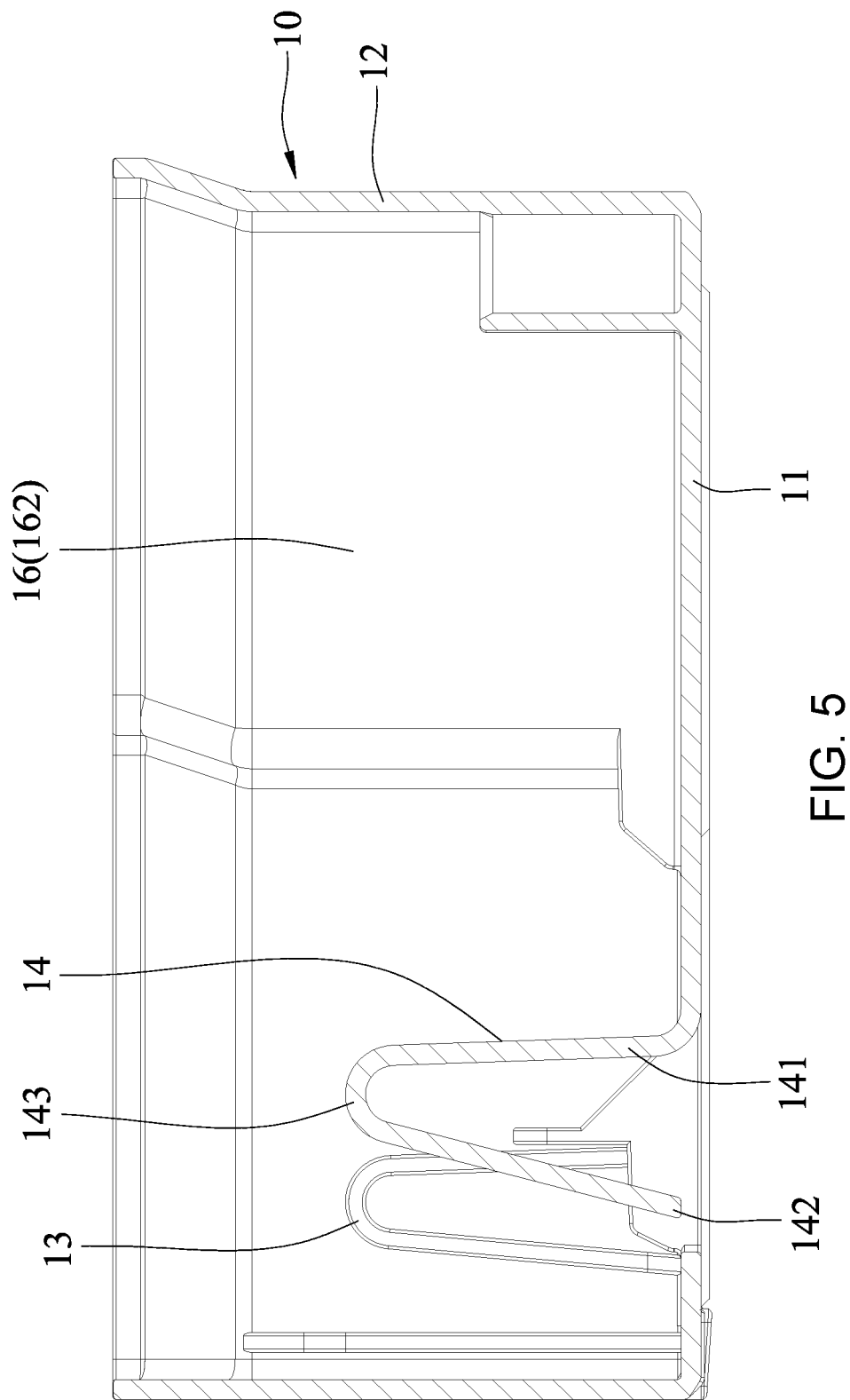
FIG. 5 is a sectional view taken along line V-V of FIG. 3.

Referring to FIGS. 3-5, the saw machine placement base 10 comprises a bottom wall 11, a peripheral wall 12 perpendicularly extended around the border of the bottom wall 11, two position clamps 13, 14 connected to the bottom wall 11, an extension panel 15 connected to one side of the peripheral wall 12, a bearing plate 17 connected to the bottom wall 11, an abutment wall 18 extended from the bottom wall 11 to the extension panel 15, and an accommodation chamber 16 surrounded by the bottom wall 11 and the peripheral wall 12.

The bottom wall 11 extends in a long-axis direction X, defining a first end portion 111, a second end portion 112 opposite to the first end portion 111, a first side edge 113 connected between the first end portion 111 and the second end portion 112 at one lateral side and straightly extended, and a second side edge 114 connected between the first end portion 111 and the second end portion 112 at an opposite side relative to the first side edge 113 in a curved manner.

The peripheral wall 12 has an inverted-L configuration. The accommodation chamber 16 is configured subject to the configuration of the curved shape of the second side edge 114, defining a narrow end 161 corresponding to the first end portion 111 and a wide end 162 corresponding to the second end portion 112.

The peripheral wall 12 has a flat surface that forms a plane P located on a top side thereof and disposed in parallel to the bearing wall 18.

The position clamps 13, 14 are mounted in the accommodation chamber 16. One position clamp 13 is disposed near the first end portion 111 and within the narrow end 161. The other position clamp 14 is disposed near the second end portion 112 and within the wide end 162. The position clamps 13, 14 exhibit an inverted-V shape, each comprising a connection end portion 131 or 141 connected to the bottom wall 11, an opposing free end portion 132 or 142, and a bent portion 133 or 143 connected between the connection end portion 131 or 141 and the free end portion 132 or 142, respectively, and protruding toward the open side of the accommodation chamber 16. The connection end portion 131 or 141 faces toward the free end portion 132 or 142. The free end portion 132 or 142 is biasable relative to the peripheral wall 12 so that a variable gap is defined between the free end portion 132 or 142 and the peripheral wall 12.

The extension panel 15 is disposed near the second end portion 112 of the bottom wall 11, and connected to one side of the peripheral wall 12. The extension panel 15 has an extension length L1 in the long-axis direction X that is not greater than one half of the length L2 of the bottom wall 11 in the long-axis direction X. The extension panel 15 comprises a connection end portion 151 connected to the peripheral wall 12, a terminal end portion 152 extending in the long-axis direction X opposite to the connection end portion 151, and a protruding rod 153 extended from the terminal end portion 152 in abutment against the abutment wall 18 and disposed corresponding to the second side edge 114.

The bearing plate 17 is a flat plate protruded in the wide end 162 of the accommodation chamber 16 and disposed adjacent to the position clamp 14.

Figure 9:
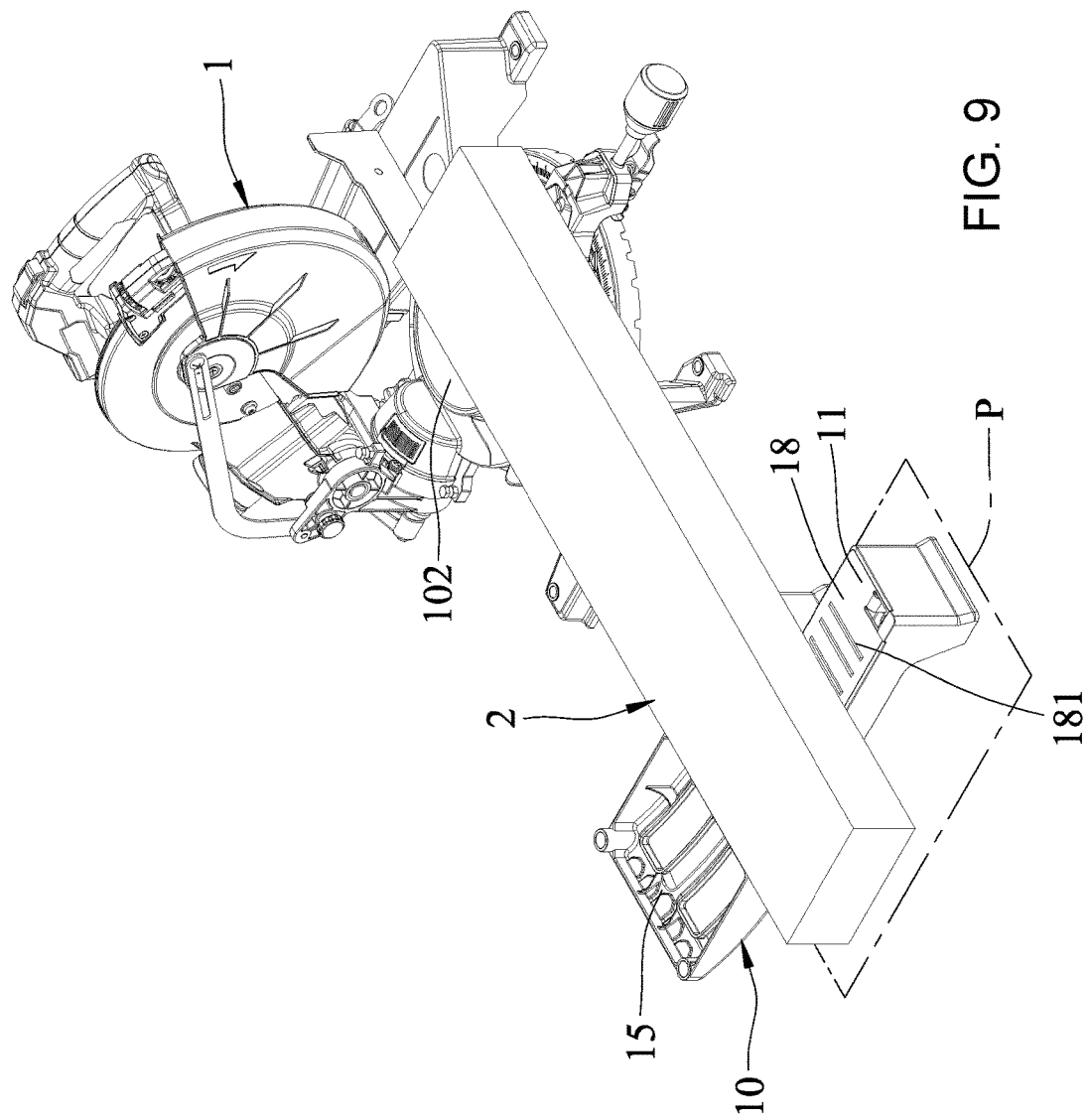
FIG. 9 is a schematic drawing illustrating an application of the saw machine placement base in accordance with the present invention.

The abutment wall 18 has a plurality of anti-slip ribs 181 (see FIG. 9).

Figure 6:
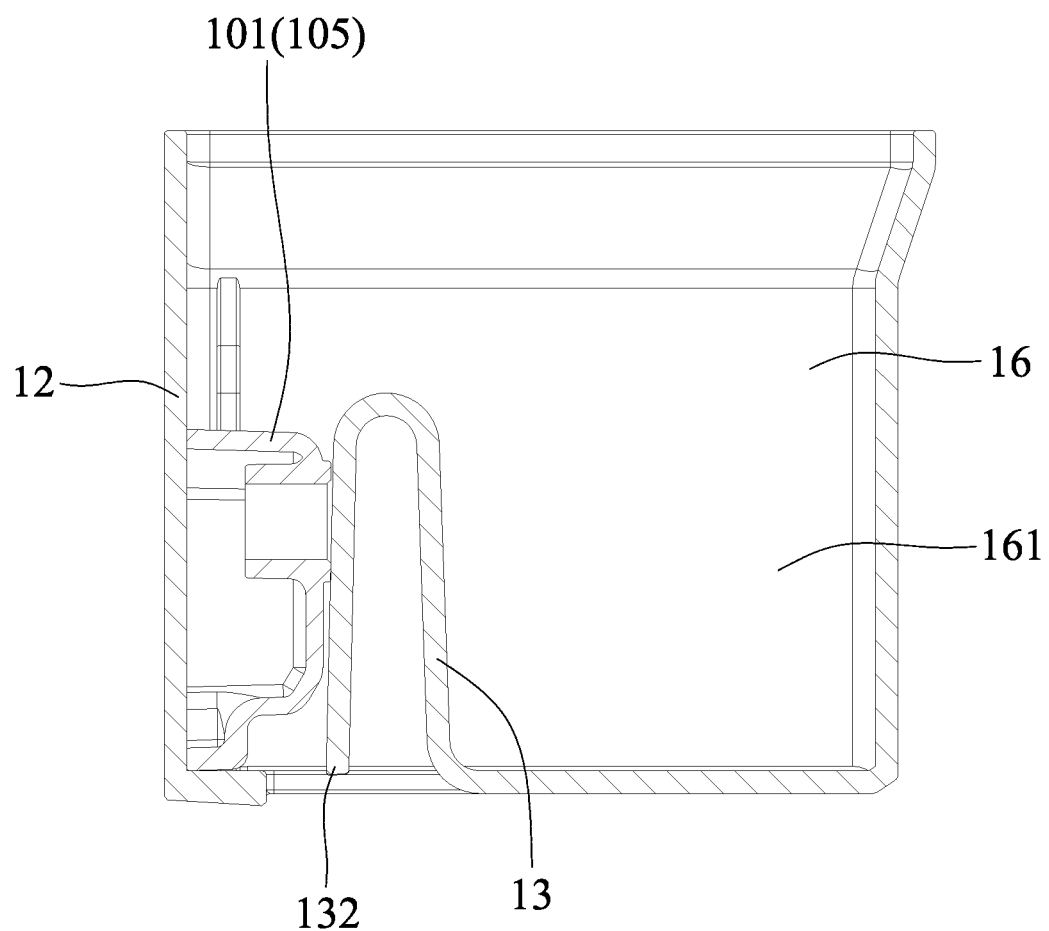
FIG. 6 is a sectional view taken along line VI-VI of FIG. 1.
Figure 7:
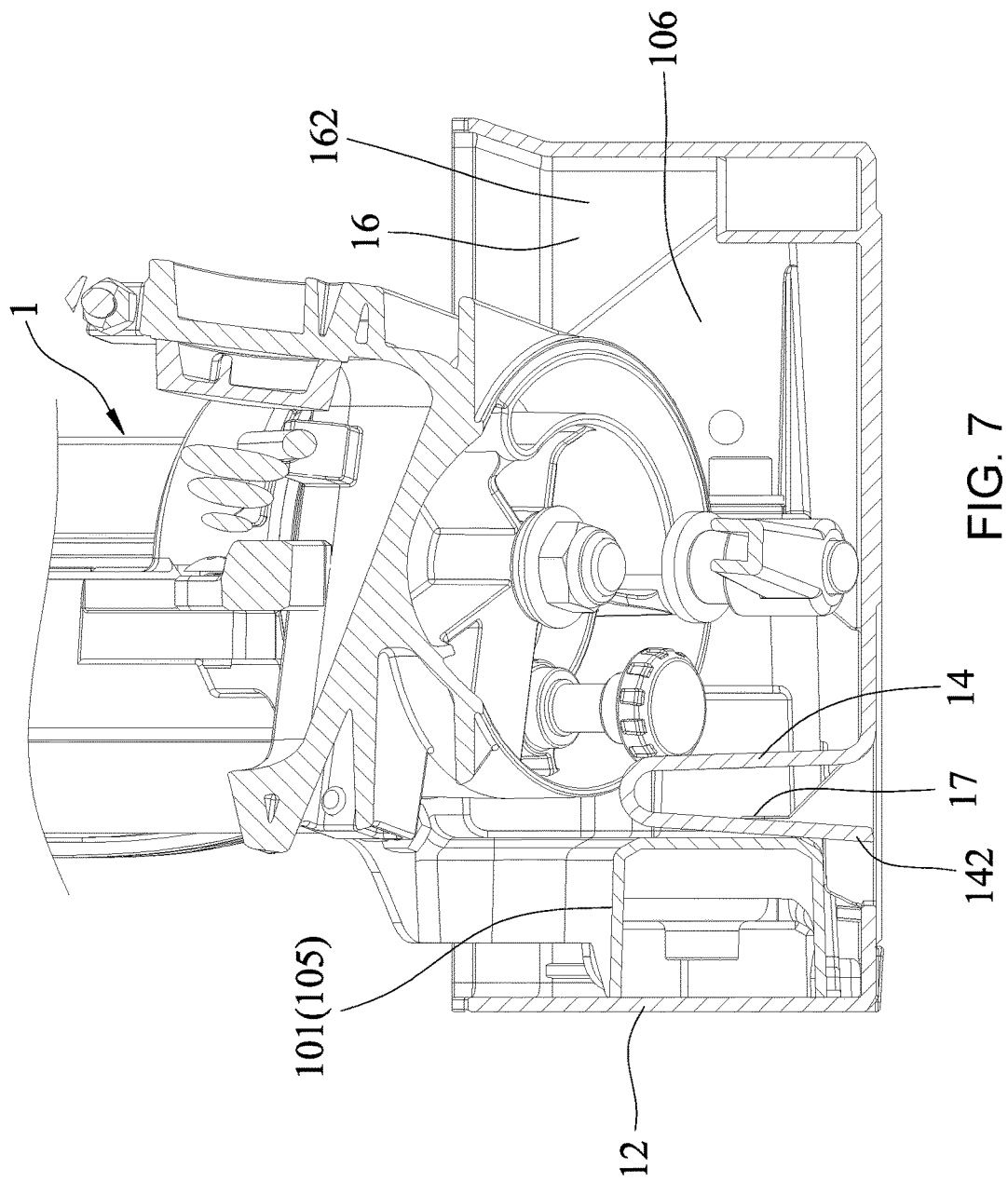
FIG. 7 is a sectional view taken along line VII-VII of FIG. 1.

As illustrated in FIG. 1, FIG. 6 and FIG. 7, when going to position the saw machine 1 in the saw machine placement base 10 after folding up the cutting unit 103, saw arm 107, saw blade 108 and power drive 109 of the saw machine 1 relative to the saw machine base 101 and the saw table 102 and the saw machine 1, the saw machine base 101 is inserted into the accommodation chamber 16 to force the foot members 105 into the respective variable gaps between the free end portions 132, 142 of the respective position clamps 13, 14 and the peripheral wall 12, enabling the foot members 105 to be respectively retained in place by the free end portions 132, 142 of the respective position clamps 13, 14 and the peripheral wall 12. Additionally, at this time, the bearing plate 17 forms a limited space for the base portion so that the bearing plate 17 also abuts against the foot member 105 to provide an auxiliary support effect. At the same time, as illustrated in FIG. 1, the rip fence 106 of the saw machine 1 in the wide end 162 is abutted against the bottom wall 11 and peripheral wall 12 of the saw machine placement base 10 at an inner side. Thus, the saw machine 1 is positively positioned in the saw machine placement base 10.

Figure 8:
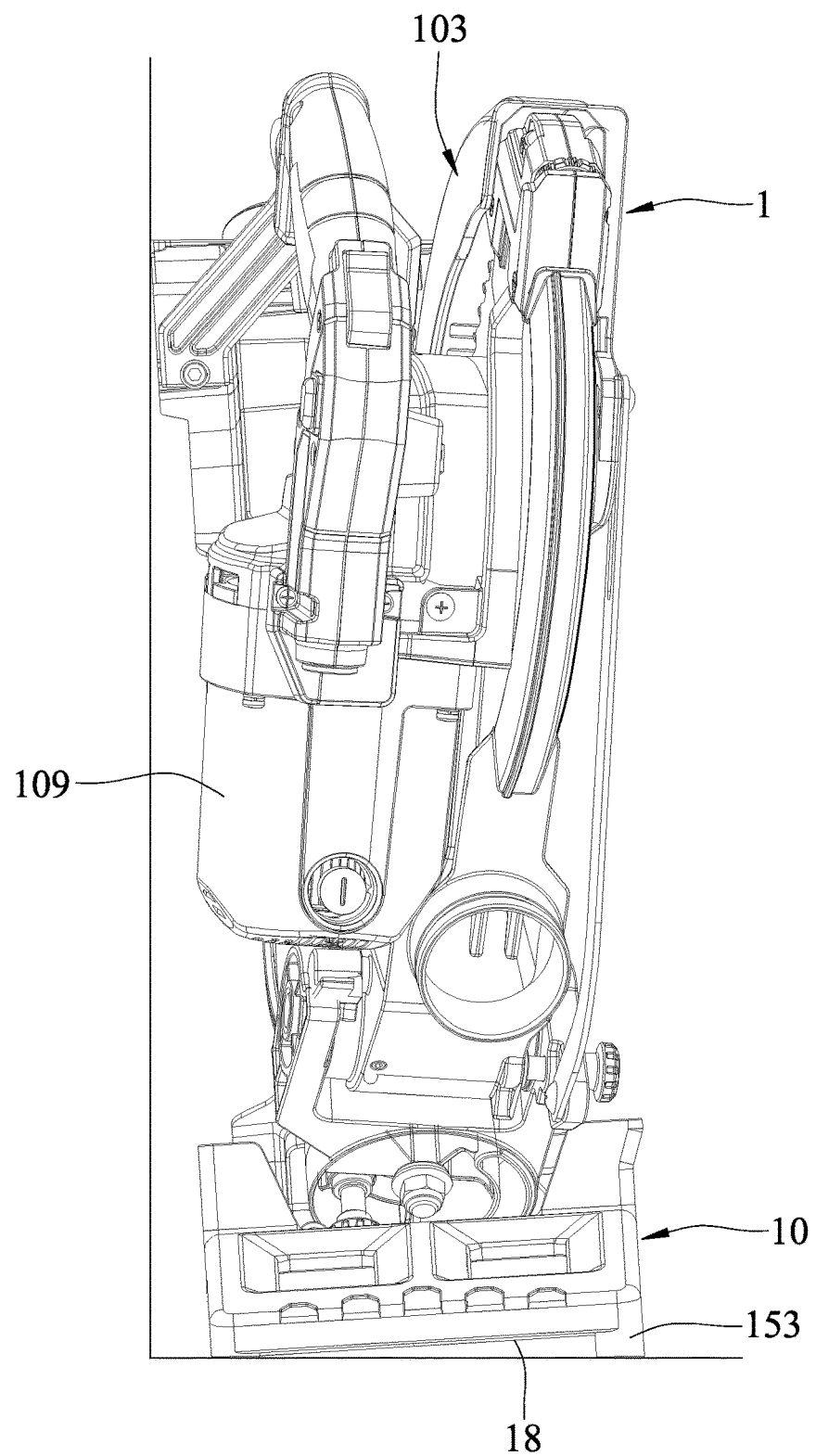
FIG. 8 is a schematic drawing illustrating the saw machine received with the saw machine placement base in a narrow storage space.

As illustrated in FIG. 8, when the cutting unit 103 is collapsed and the saw machine 1 is positioned in the saw machine placement base 10, the saw machine placement base 10 can be placed on the floor to hold the saw machine 1 in an upright standing position. Since the saw machine 1 is held in the upright standing position after positioned in the saw machine placement base 10, the saw machine placement base 10 with the received saw machine 1 can be received in a narrow storage space, facilitating optimum space utilization.

Further, as illustrated in FIG. 9, in addition to the function of holding the saw machine 1 in the upright standing position, the saw machine placement base 10 is also usable in conjunction with the saw machine 1 to achieve the purpose of extending the support surface, i.e., the saw machine placement base 10 can be turned upside down through 180-degrees and then positively placed on the floor with the flat surface of the peripheral wall 12 kept in contact with the floor, e.g., based on the flat surface forming the plane P. At this time, the abutment wall 18 faces upward, allowing a workpiece 2 to be supported between the abutment wall 18 of the saw machine placement base 10 and the saw table 102 and positively abutted against the anti-slip ribs 181 of the abutment wall 18.

In one of the embodiments of the present invention, the position clamps 13, 14 are connected to the bottom wall 11 of the saw machine placement base 10. However, in actual application, the position clamps can be connected to the peripheral wall 12 of the saw machine placement base 10 for allowing the free end portions 132, 142 of the position clamps 13, 14 to be biased relative to the peripheral wall 12 so that variable gaps can be respectively provided between the free end portions 132, 142 of the position clamps 13, 14 and the peripheral wall 12 of the saw machine placement base 10 to achieve the same effects of the aforesaid preferred embodiment.

In conclusion, the saw machine placement base of the present invention is simple in structure and can hold the collapsed saw machine 1 positively in place to accurately achieve one of the objects of the present invention.

Although a particular embodiment of the invention has been described in detail for purposes of illustration, various modifications and enhancements may be made without departing from the spirit and scope of the invention. For example, multiple position clamps can be used in the accommodation chamber for positioning the saw machine in the saw machine placement base. Accordingly, the invention is not to be limited except as by the appended claims.

What is claimed is:

1. A saw machine placement base holding a saw machine comprising a saw machine base, a saw table mounted at said saw machine base and a cutting unit pivotally connected to said saw table, the saw machine placement base comprising:
   a bottom wall;
   a peripheral wall interconnected with said bottom wall;
   an accommodation chamber formed by said bottom wall and said peripheral wall; and
   at least one position clamp connected to one of said bottom wall and said peripheral wall within said accommodation chamber, wherein said at least one position clamp and said accommodation chamber are configured to secure said saw machine base in said accommodation chamber between said at least one position clamp and said peripheral wall so that the saw machine is in an upright standing position.

2. The saw machine placement base as claimed in claim 1, wherein said at least one position clamp comprises a connection end portion connected to said bottom wall and a free end portion opposite to said connection end portion, said free end portion of said at least one position clamp defining with said peripheral wall a variable gap therebetween.

3. The saw machine placement base as claimed in claim 2, wherein said bottom wall defines a first end portion and an opposing second end portion, wherein the at least one position clamp comprises two position clamps, and said two position clamps are respectively disposed near said first end portion and said second end portion of said bottom wall.

4. The saw machine placement base as claimed in claim 3, wherein said position clamps are formed to have an inverted-V shape, each further comprising a bent portion connected between said connection end portion and said free end portion thereof and protruding toward an open side of said accommodation chamber, said connection end portion of each said position clamps being disposed to face toward the said free end portion of the respective said position clamp.

5. The saw machine placement base as claimed in claim 3, wherein said bottom wall extends in a long-axis direction; said first end portion and said second end portion of said bottom wall extend in opposite directions in said long-axis direction; the saw machine placement base further comprises an extension panel disposed near said second end portion of said bottom wall and connected to one side of said peripheral wall, said extension panel having an extension length in said long-axis direction, said extension length being equal to or smaller than one half of the length of said bottom wall in said long-axis direction.

6. The saw machine placement base as claimed in claim 5, further comprising an abutment wall extended from said bottom wall, wherein said bottom wall further comprises a first side edge connected between said first end portion and said second end portion having a straight profile and a second side edge disposed opposite to said first side edge having a first bend and a second bend and having a curved profile; and said extension panel comprises a connection end portion connected to said peripheral wall, an opposing terminal end portion opposite to the connection end portion, and a protruding rod extending from said terminal end portion and disposed on a same side as said second side edge.

7. The saw machine placement base as claimed in claim 6, wherein said peripheral wall comprises a flat surface disposed at a top side thereof in parallel to said abutment wall.

8. The saw machine placement base as claimed in claim 6, wherein said abutment wall comprises a plurality of anti-slip ribs.

9. The saw machine placement base as claimed in claim 1, further comprising at least one bearing plate connected to said bottom wall and protruded in said accommodation chamber.

10. A saw machine comprising:
a saw machine base;
a saw table mounted at said saw machine base;
a cutting unit pivotally connected to said saw table; and
a saw machine placement base comprising:
　a bottom wall;
　a peripheral wall interconnected with said bottom wall;
　an accommodation chamber formed by said bottom wall and said peripheral wall; and
　at least one position clamp connected to one of said bottom wall and said peripheral wall within said accommodation chamber, wherein said at least one position clamp and said accommodation chamber are configured to secure said saw machine base in said accommodation chamber between said at least one position clamp and said peripheral wall so that the saw machine is in an upright standing position.

\* \* \* \* \*